(12) United States Patent
Schuttenberg et al.

(10) Patent No.: US 9,405,542 B1
(45) Date of Patent: Aug. 2, 2016

(54) METHOD AND APPARATUS FOR UPDATING A SPECULATIVE RENAME TABLE IN A MICROPROCESSOR

(71) Applicant: Marvell International Ltd., Hamilton (BM)

(72) Inventors: Kim Schuttenberg, Gilbert, AZ (US); Sridharan Balasubramanian, Chandler, AZ (US)

(73) Assignee: Marvell International LTD., Hamilton (BM)

( * ) Notice: Subject to any disclaimer, the term of this patent is extended or adjusted under 35 U.S.C. 154(b) by 637 days.

(21) Appl. No.: 13/849,120

(22) Filed: Mar. 22, 2013

Related U.S. Application Data

(60) Provisional application No. 61/620,917, filed on Apr. 5, 2012.

(51) Int. Cl.
*G06F 9/38* (2006.01)
*G06F 9/30* (2006.01)

(52) U.S. Cl.
CPC ............ *G06F 9/30098* (2013.01); *G06F 9/384* (2013.01); *G06F 9/3855* (2013.01)

(58) Field of Classification Search
None
See application file for complete search history.

(56) References Cited

U.S. PATENT DOCUMENTS

| | | | | |
|---|---|---|---|---|
| 5,852,726 A * | 12/1998 | Lin | ...................... | G06F 9/30036 712/200 |
| 5,944,810 A * | 8/1999 | Cherabuddi | ........ | G06F 9/30105 712/217 |
| 6,263,416 B1 * | 7/2001 | Cherabuddi | ........ | G06F 9/30105 712/17 |
| 6,622,237 B1 * | 9/2003 | Keller | .................... | G06F 9/3834 712/214 |
| 6,651,161 B1 * | 11/2003 | Keller | .................... | G60F 9/3834 712/216 |
| 6,694,424 B1 * | 2/2004 | Keller | .................... | G06F 9/3834 712/216 |
| 2005/0055541 A1 * | 3/2005 | Aamodt | .............. | G06F 9/30101 712/217 |
| 2008/0114966 A1 * | 5/2008 | Begon | .................... | G06F 9/3824 712/217 |
| 2008/0148022 A1 * | 6/2008 | Piry | ......................... | G06F 9/384 712/217 |
| 2012/0005444 A1 * | 1/2012 | Rupley | .................. | G06F 9/3857 711/166 |
| 2013/0151819 A1 * | 6/2013 | Piry | ......................... | G06F 9/38 712/217 |

* cited by examiner

*Primary Examiner* — Michael Sun

(57) ABSTRACT

A processor including architectural registers used to execute instructions and a renaming module to rename the architectural registers to physical registers in response to receiving instructions. A first table stores pointers to the physical registers storing data generated in response to the processor completing execution of instructions. A second table stores pointers to the physical registers storing data to be generated by instructions received but not executed by the processor and used by instructions to be received by the processor. An execution module executes instructions and discards one or more instructions received but not executed by the processor in response to an event. An updating module updates pointers in the second table in response to the event. The updated pointers are generated based on pointers stored in the first table at a time of occurrence of the event and instructions not discarded by the execution module.

14 Claims, 16 Drawing Sheets

METHOD AND APPARATUS FOR UPDATING A SPECULATIVE RENAME TABLE IN A MICROPROCESSOR

CROSS-REFERENCE TO RELATED APPLICATIONS

This disclosure claims the benefit of U.S. Provisional Application No. 61/620,917, filed on Apr. 5, 2012. The entire disclosure of the application referenced above is incorporated herein by reference.

FIELD

The present disclosure relates generally to high-performance microprocessor logic design and more particularly to updating a speculative rename table to simplify high-performance microprocessor logic design.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many modern microprocessors can execute multiple instructions at once. The instructions typically access architectural registers to perform respective operations. The number of architectural registers, however, is generally limited. Accordingly, if multiple instructions need to write to the same architectural register, the processor may need to serialize the instructions, which can adversely affect the performance of the processor.

One way to solve this problem is to use register renaming, where each time an architectural register is written to, the architectural register is mapped to a different physical register with a different name. A table shows which architectural register references which physical register at a given time.

SUMMARY

A processor comprises a plurality of architectural registers of the processor, where the architectural registers are used by the processor to execute one or more instructions. A renaming module is configured to rename one or more of the architectural registers to one or more physical registers in the processor in response to the processor receiving a plurality of instructions for execution. A memory comprises a first table configured to store pointers to the physical registers storing data generated in response to the processor completing execution of one or more instructions, and a second table configured to store pointers to the physical registers storing data to be (i) generated by a set of instructions received but not executed by the processor and (ii) used by instructions to be received by the processor. An execution module is configured to execute the plurality of instructions, and discard one or more instructions from the set of instructions received but not executed by the processor in response to an event. An updating module is configured to update pointers in the second table in response to the event. The updated pointers are generated based on (i) pointers stored in the first table at a time of occurrence of the event, and (ii) one or more instructions from the set of instructions not discarded by the execution module.

In other features, the execution module is configured to execute an instruction subsequent to the event based on the updated pointers.

In other features, the updating module is configured to update the pointers in the second table in a time period equivalent to one instruction cycle of the processor.

In other features, the updating module is configured to update the pointers in the second table by (i) copying the pointers from the first table to the second table, and (ii) updating the pointers copied into the second table based on the one or more instructions from the set of instructions not discarded by the execution module.

In other features, the processor further comprises a first-in first-out memory configured to store instructions received but not executed by the processor in an order in which the instructions are received by the renaming module.

In other features, the updating module is configured to update the pointers in the second table using the one or more instructions from the set of instructions not discarded by the execution module in the order in which the instructions are stored in the first-in first-out memory.

In other features, the updating module is configured to update the pointers in the second table using the one or more instructions from the set of instructions not discarded by the execution module in an opposite order in which the instructions are stored in the first-in first-out memory.

In still other features, a method comprises renaming one or more of architectural registers of a processor to one or more physical registers in the processor in response to the processor receiving a plurality of instructions for execution, where the architectural registers are used by the processor to execute one or more of the plurality of instructions. The method further comprises storing, in a first table, pointers to the physical registers storing data generated in response to the processor completing execution of one or more instructions; and storing, in a second table, pointers to the physical registers storing data to be (i) generated by a set of instructions received but not executed by the processor and (ii) used by instructions to be received by the processor. The method further comprises executing the plurality of instructions and discarding one or more instructions from the set of instructions received but not executed by the processor in response to an event. The method further comprises updating pointers in the second table in response to the event, where the updated pointers are generated based on (i) pointers stored in the first table at a time of occurrence of the event, and (ii) one or more instructions from the set of instructions not discarded.

In other features, the method further comprises executing an instruction subsequent to the event based on the updated pointers.

In other features, the method further comprises updating the pointers in the second table in a time period equivalent to one instruction cycle of the processor.

In other features, the method further comprises updating the pointers in the second table by (i) copying the pointers from the first table to the second table, and (ii) updating the pointers copied into the second table based on the one or more instructions from the set of instructions not discarded.

In other features, the method further comprises storing, in a first-in first-out memory, instructions received but not executed by the processor in an order in which the instructions are received.

In other features, the method further comprises updating the pointers in the second table, using the one or more instructions from the set of instructions not discarded, in the order in which the instructions are stored in the first-in first-out memory.

In other features, the method further comprises updating the pointers in the second table, using the one or more instructions from the set of instructions not discarded, in an opposite order in which the instructions are stored in the first-in first-out memory.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

One method used to optimize execution of an instruction stream in a microprocessor is called register renaming. This solves the problem of anti-dependency and write-after-write data dependency cases. The problem is solved by assigning different versions of the same register different physical locations and renaming which physical register maps to which architectural register each time the register is written. In a variant of register renaming called a physical register file, the design disposes of the need to ever copy the data from a renamed location to a fixed physical location, opting instead to just update a pointer in a register address table.

A high-performance system will actually include two of these tables (or one table with twice as many entries). One of the tables is the architectural state of the register renaming (as defined by all retired instructions), and the other table is the speculative renaming state, which is identical to the architectural state but as modified by all outstanding instructions. The speculative state is used by new instructions to identify the source for their data. This is illustrated by the sequence shown in FIGS. 1A-1E (described in detail later), which show a simplified system using a physical register file to rename four architectural registers.

Figure 2A:
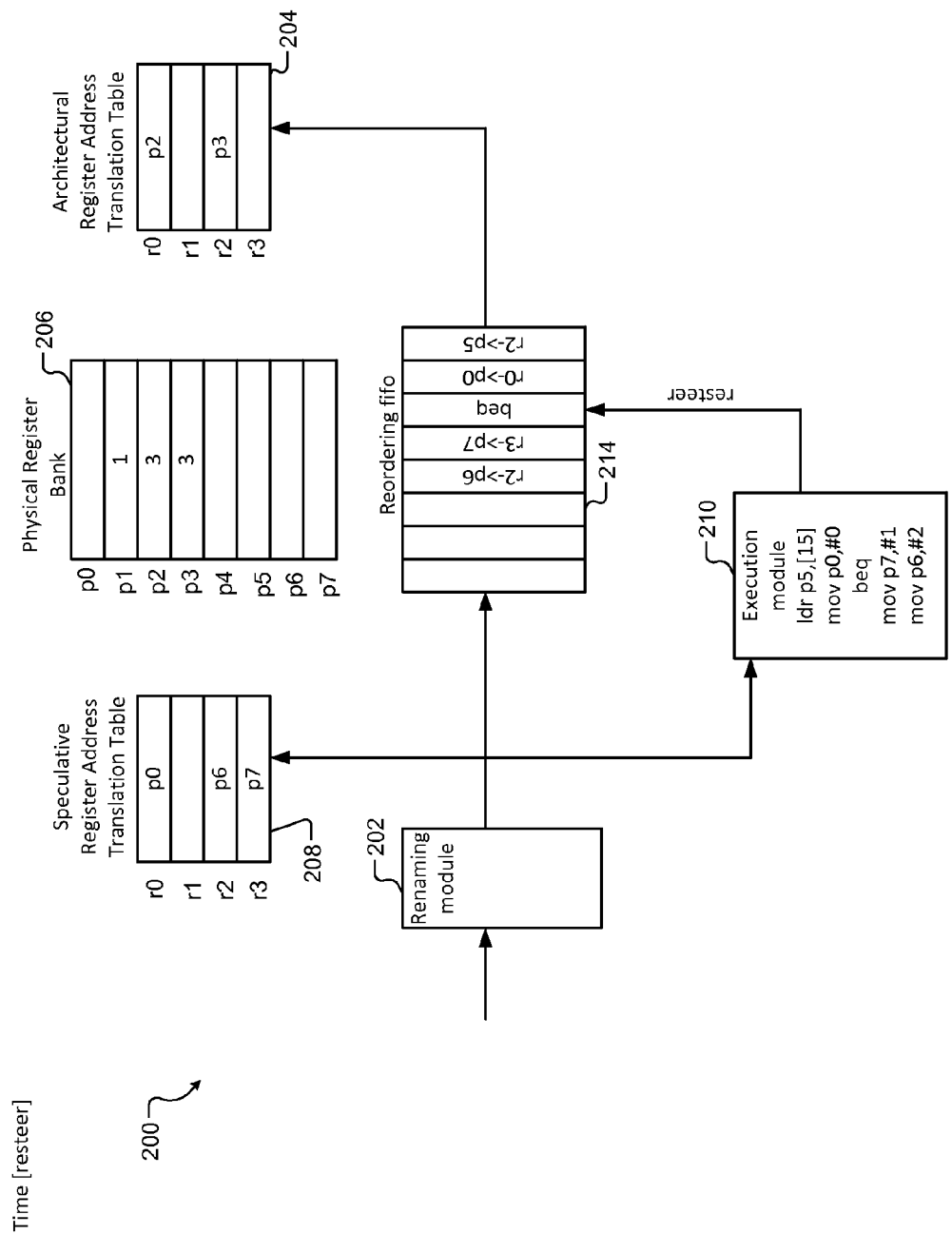
FIGS. 2A and 2B illustrate a state of a speculative register address translation (RAT) table in the processor when an unexpected event occurs during instruction execution.
Figure 2B:
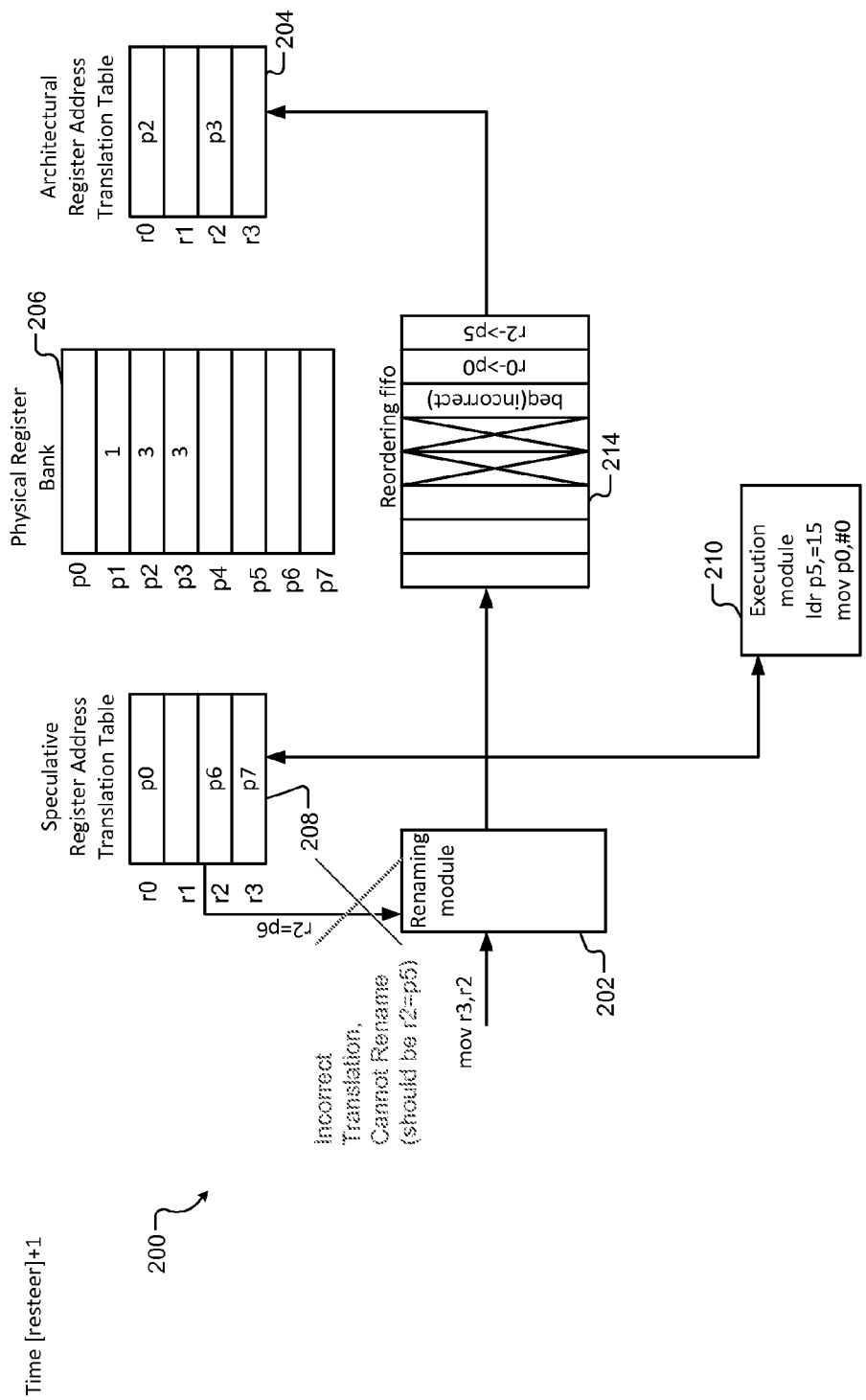

When an unexpected change of execution direction (e.g., a mis-predicted branch or exception) occurs, some but potentially not all of the outstanding operations will be discarded. When this happens, the correct state of the speculative renaming table would be the state of the architectural table plus the influence of all of the outstanding instructions that were not discarded. However, immediately following the discarding of some of the outstanding instructions, the speculative table incorrectly reflects the influence of the discarded instructions, and any new instructions may then get wrong physical register mapping, and hence wrong data. This is shown in FIGS. 2A and 2B, which are described in detail later.

This problem can be solved in many ways. The most basic approach involves waiting for all outstanding instructions to complete and retire, at which point the architectural renaming table can simply be copied to the speculative table, since with no outstanding operations, the two tables should be equivalent. Another approach involves saving the state of the speculative table at a defined set of key points (e.g., at branches that could be mis-predicted), and then copying the saved state back to the speculative renaming table.

Both these approaches have disadvantages. In the first approach, the time spent waiting for operations to retire would be better spent executing new instructions, and could be quite long, depending on the instruction mix. In the second approach, the amount of memory needed to save and restore copies of the renaming table quickly grows unwieldy and expensive in terms of area and power.

The present disclosure relates to methods for correcting the speculative rename table that provides a much better balance between performance and cost than the two approaches described above. A first method according to the present disclosure copies the architectural renaming table to the speculative table, and then iteratively updates it with the influence of all outstanding instructions that have not been discarded in code order. Once all outstanding instructions have been processed into the updated speculative rename table, new instructions can be allowed into the system again. While this method involves some waiting for the table to be updated, unlike waiting for the instructions to finish, the wait is known and much shorter than the first approach described above. In many cases, the wait is short enough to end before a first new instruction arrives to look up the speculative rename table.

A second method according to the present disclosure updates the table with the outstanding instructions in a reverse order. Accordingly, an instruction may not have to wait for the full table to be restored, as long as the entry needed by the instruction has been updated. This method is feasible and efficient because in most, if not all instruction set architectures, the register values seen by an instruction are the result of the next oldest instruction that updates the location. Accordingly, if the instructions are processed to update the speculative rename table in reverse order (youngest to oldest), once an entry has been updated, the updated entry has a correct value, and updates to the entry from an older instruction will be blocked.

In either method, the number of entries that can be processed in a cycle may be variable or fixed, and may differ depending on implementation. For example, FIGS. 3A and 3B (described in detail later) show an implementation that processes all the outstanding entries in a single cycle while FIGS. 4A-4D (described later in detail) show an implementation that processes one entry per cycle. A practical implementation may be in between these two implementations, for example, processing 4 or 8 entries per cycle.

FIGS. 1A-1F show an example of a system for renaming four architectural registers of a processor 200. The system includes a renaming module 202, and architectural register address translation (RAT) table 204, a physical register bank 206, a speculative RAT table 208, an execution module 210, and a FIFO buffer 214. The system executes instructions of a program code. The system does not execute the instructions sequentially, that is, in the order in which they appear in the program code, and yet provides results as if the instructions are executed in the order in which they appear in the program code.

The architectural RAT table 204 stores pointers for architectural registers r0 through r3. A pointer for an architectural register points to a physical register (any physical register from p0 through p7) where data corresponding to the architectural register is stored. The data is generated by a retired instruction. The speculative RAT table 208 stores pointers to physical registers where data to be used by instructions that are yet to be executed by the processor 200 is stored.

Figure 1A:
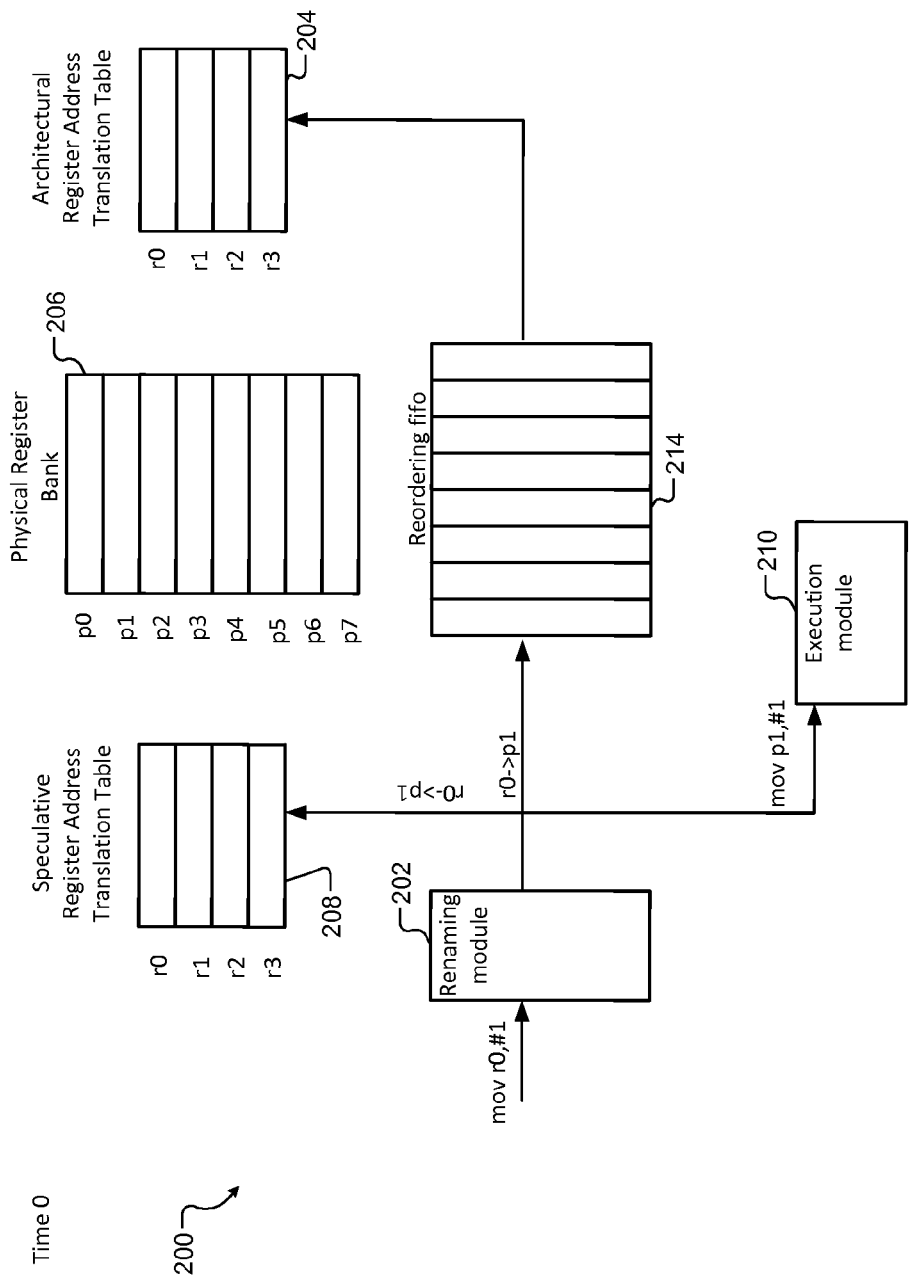
FIGS. 1A-1F show an example of a system for renaming architectural registers of a processor according to the prior art.
Figure 1B:
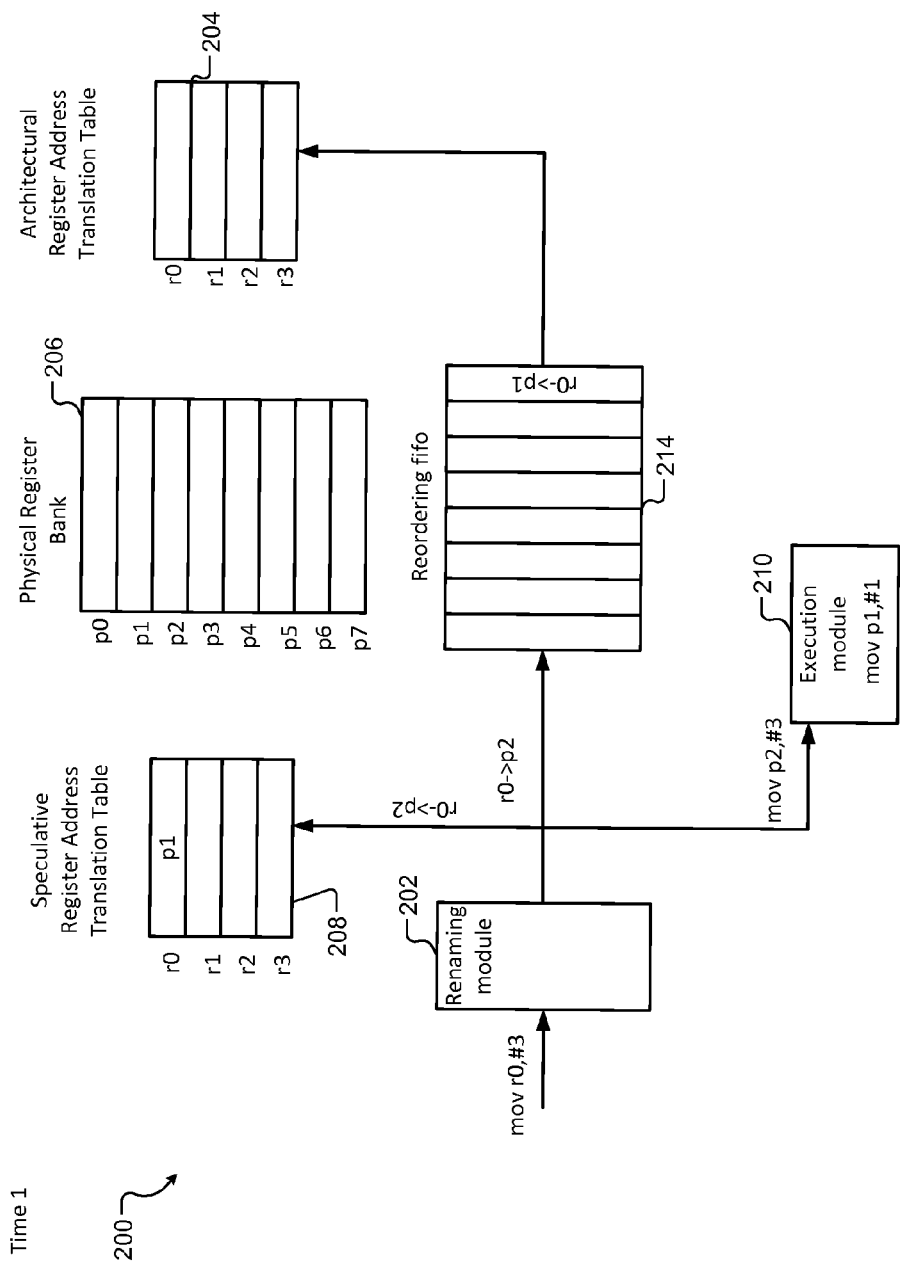

For example, FIGS. 1A and 1B show two operations that write to the architectural register r0. In FIG. 1A, at time 0, a command mov r0,#1 is received to write a value 1 to the architectural register r0. Subsequently, in FIG. 1B, at time 1, a command mov r0,#3 is received to write a value 3 to the architectural register r0. In FIG. 1A, the renaming module 202 renames the architectural register r0 to the physical register p1; and the execution module 210 executes a command mov p1,#1 to write the value 1 into the physical register p1.

In FIG. 1B, the renaming module 202 renames the architectural register r0 to the physical register p2; and the execution module 210 executes a command mov p2,#3 to write the value 3 into the physical register p2. In the speculative RAT table 208, an entry for the architectural register r0 points to the physical register p1.

Figure 1C:
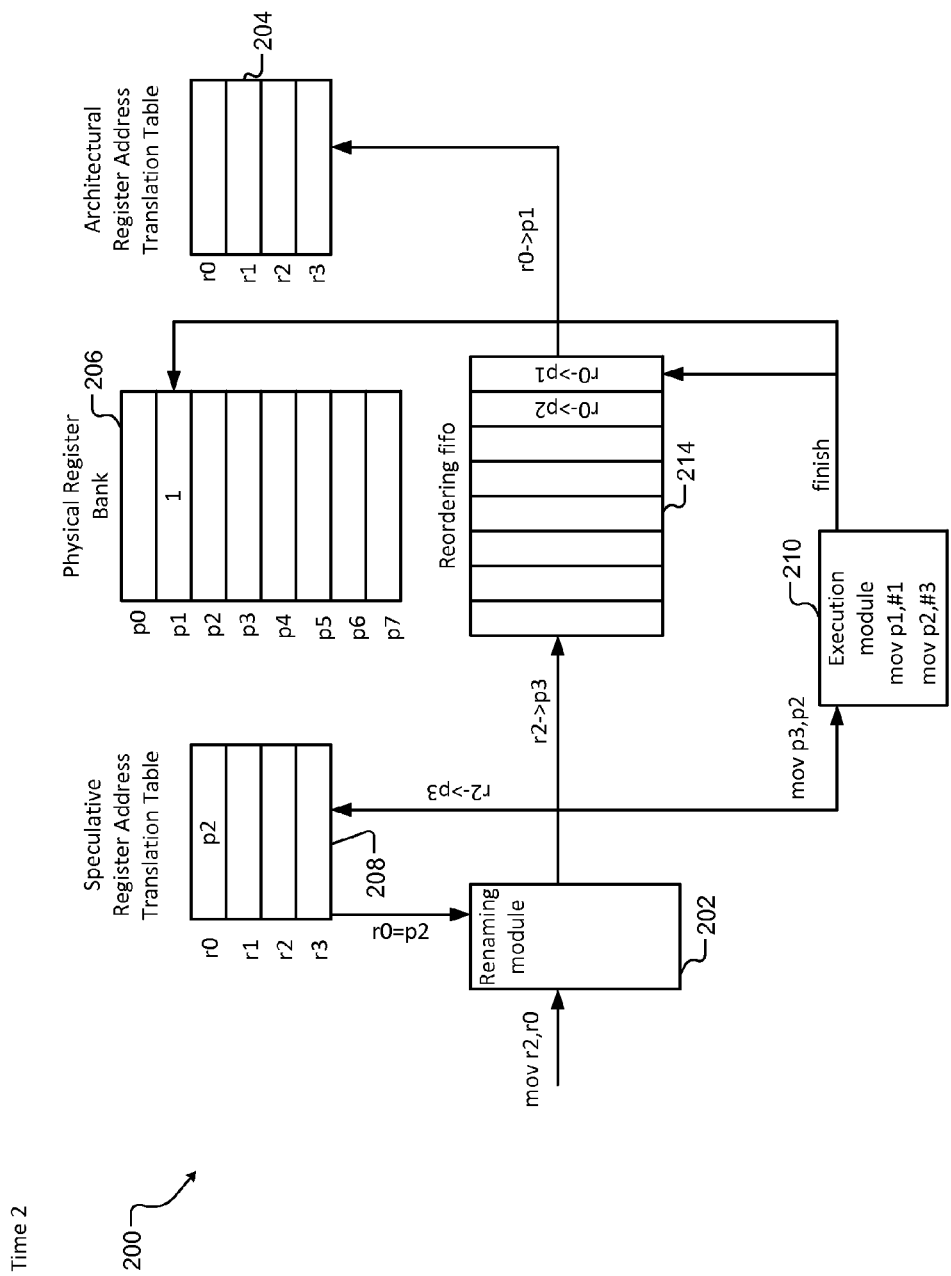

In FIG. 1C, at time 2, an instruction mov r2,r0 is received. The renaming module 202 renames the architectural register r2 to the physical register p3, and the speculative RAT table 208 provides the value of the architectural register r0 stored in the physical register p2 based on the renaming operation performed immediately preceding the instruction mov r2,r0. The command mov r0,#1 shown in FIG. 1A is completed (i.e., retired). Accordingly, the value 1 is written in the physical register p1, and the pointer to the physical register p1 is stored in the entry for the architectural register r0 in the architectural RAT table 204.

Figure 1D:
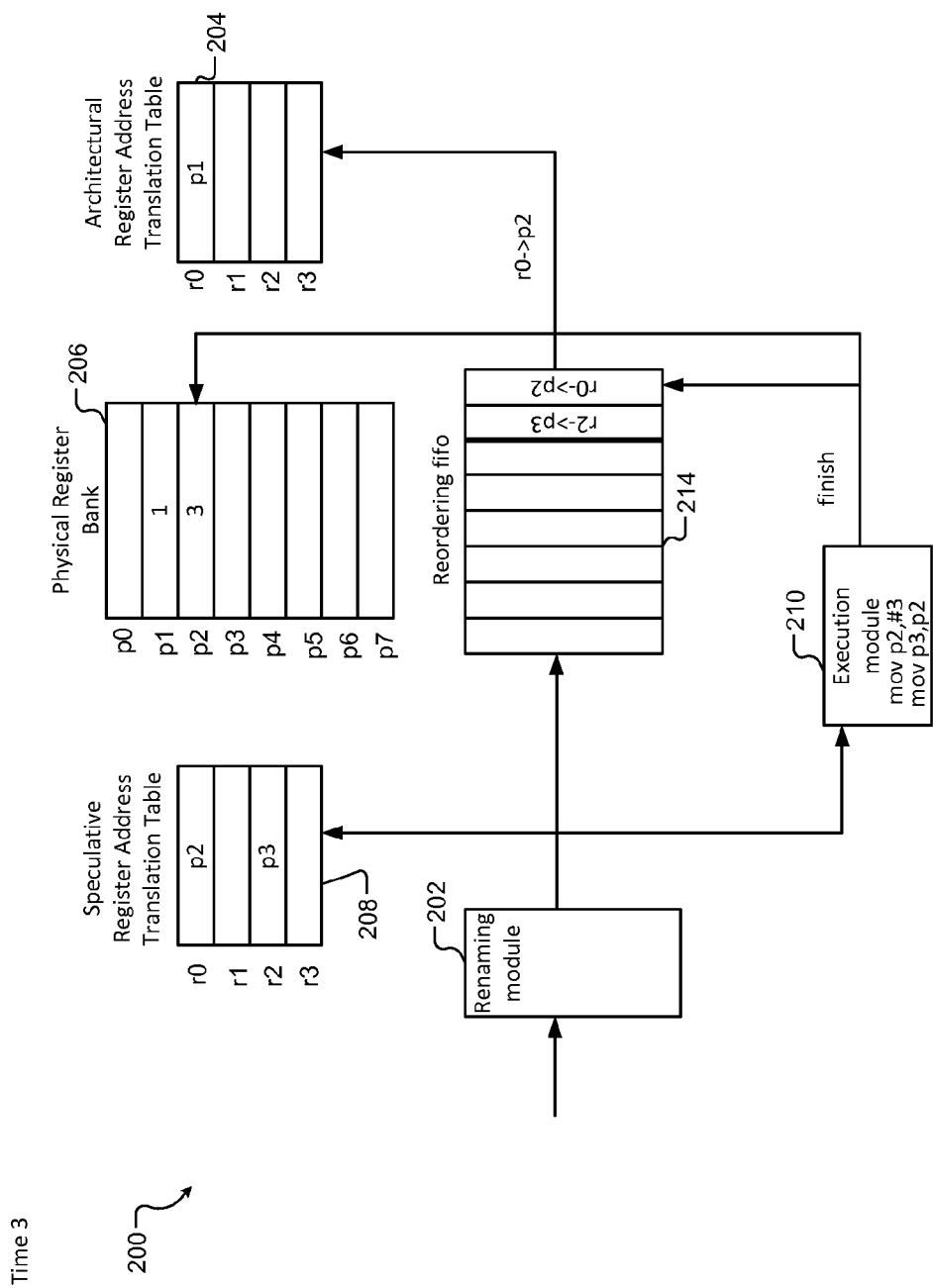
Figure 1E:
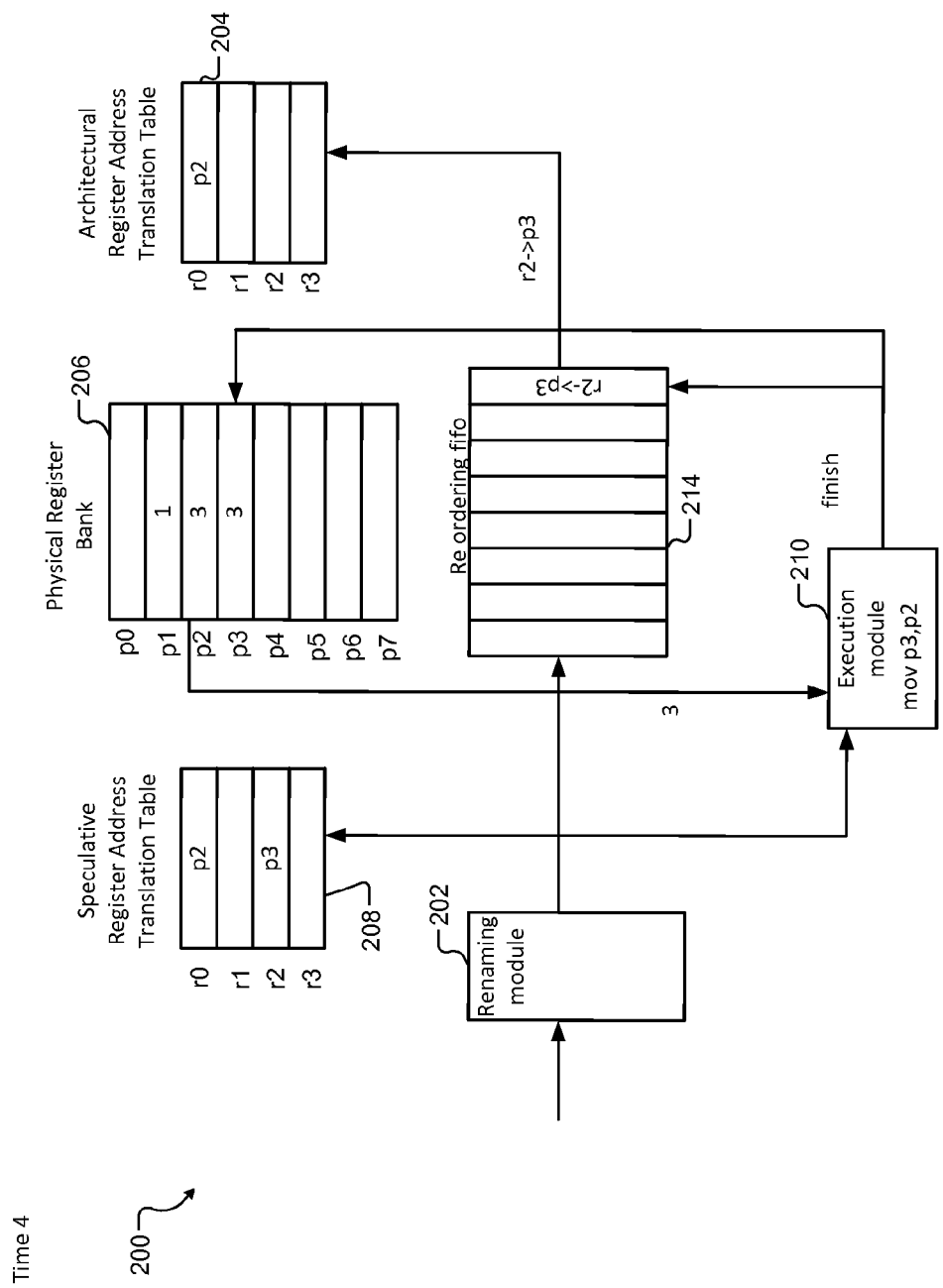

In FIG. 1D, at time 3, the execution module 210 executes the command mov p3,p2, which writes the value 3 in the physical register p2. No new instructions are received in FIGS. 1D-1F. In FIG. 1E, at time 4, the execution module 210 finishes the execution of the command mov p3,p2, and the value 3 from the physical register p2 is written to the physical register p3.

Figure 1F:
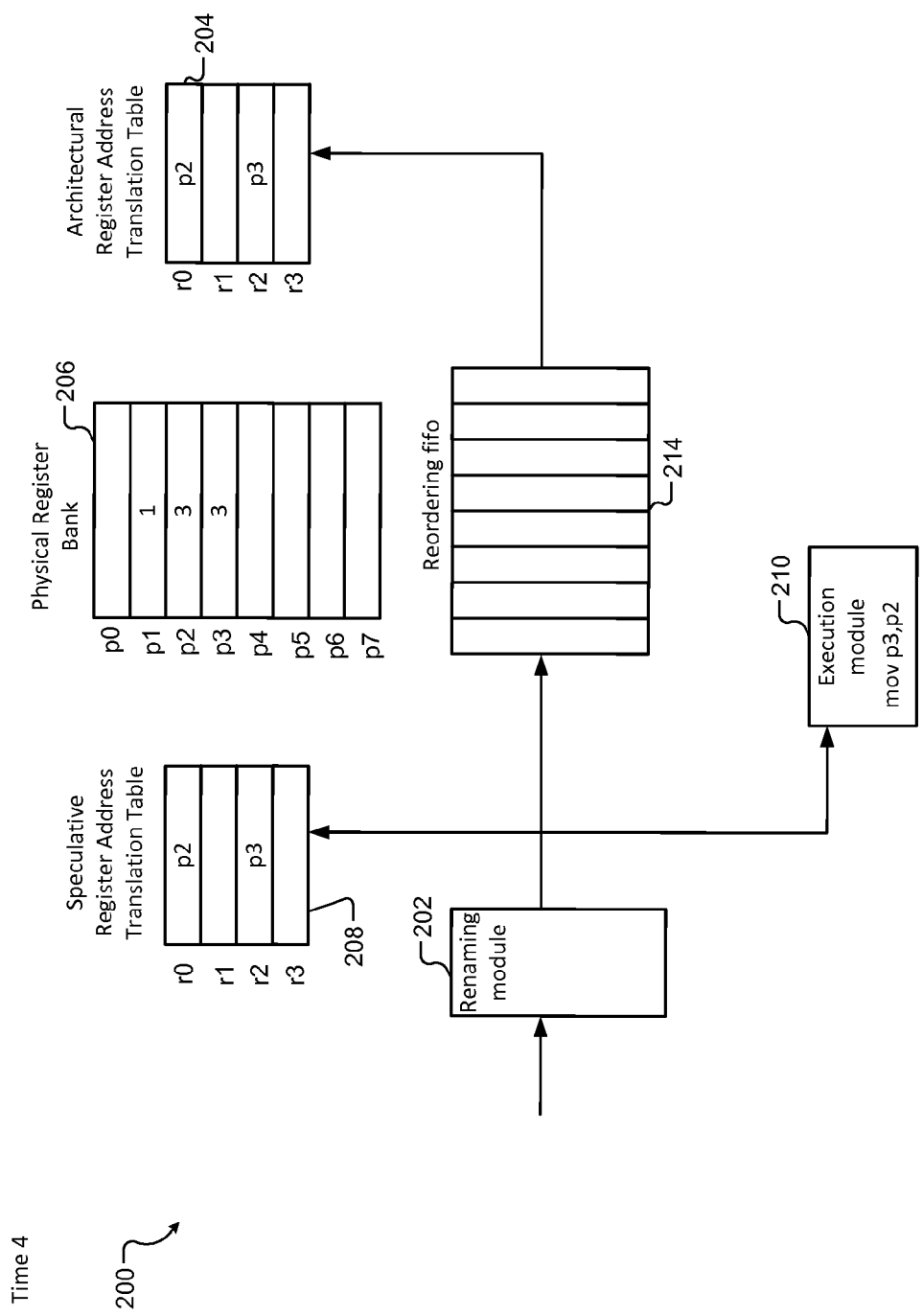

FIG. 1F shows the final state of the system when the execution of all three instructions shown in FIGS. 1A-1C is completed (i.e., the instructions are retired). Specifically, in both the architectural RAT table 204 and the speculative RAT table 208, the architectural register r2 points to the physical register p3 storing the value of 3, and the architectural register r0 points to the physical register p2 storing the value of 3.

FIGS. 2A and 2B illustrate the problem being solved by the present disclosure. For example, in FIG. 2A, the FIFO buffer 214 contains five instructions that are currently outstanding (i.e., instructions that are received, renamed, but not yet retired). One of the outstanding instructions is a branch instruction (e.g., branch if equal to beq). Suppose that the branch instruction is mis-predicted (e.g., the branch is taken instead of not branching). As a result, the two instructions after the branch instruction (move p7,#1 and move p6,#2) should not be executed following the branch instruction. Instead, some other instructions should be executed following the branch instruction.

In FIG. 2B, the two instructions after the branch instruction are shown crossed out (i.e., deleted from the FIFO buffer 214). The speculative RAT table 208, however, still contains pointers to the physical registers p6 and p7 stored in the entries for the architectural registers r2 and r3, respectively, since the physical registers p7 and p6 are speculatively mapped to the architectural registers r2 and r3, respectively.

Accordingly, if a new instruction such as mov r3,r2 (shown in FIG. 2B) is received, the speculative RAT table 208 will provide the incorrect value of the architectural register r2 as r2=p6. Instead, the new instruction should receive the correct value for the architectural register r2 as r2=p5, which is the result of the valid instruction immediately preceding the branch instruction, but which is not yet in the architectural RAT table 204 since the instruction is not yet retired.

One way to solve the problem (i.e., in the above example, to get the architectural register r2 in the speculative RAT table 208 to point correctly to p5 before a new instruction is received), is to wait until the instructions in the FIFO buffer 214 retire and then copy the contents of the architectural RAT table 204 to the speculative RAT table 208. The present disclosure solves the problem without waiting for the instructions to retire as follows. FIGS. 3A-4D show a processor 201 according to the present disclosure.

Figure 3A:
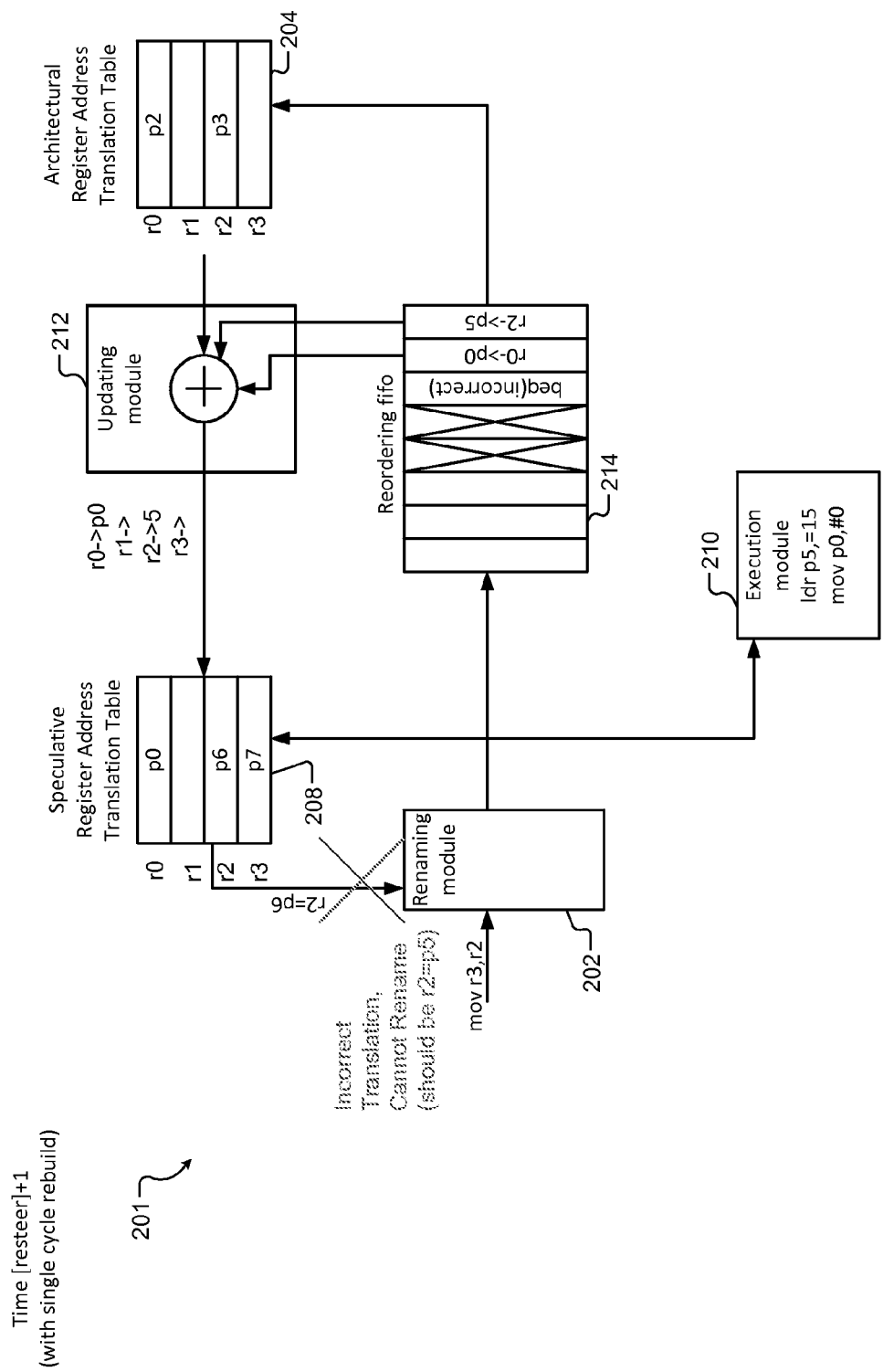
FIGS. 3A and 3B show a method for updating the speculative RAT table in a single instruction cycle of the processor according to the present disclosure.
Figure 3B:
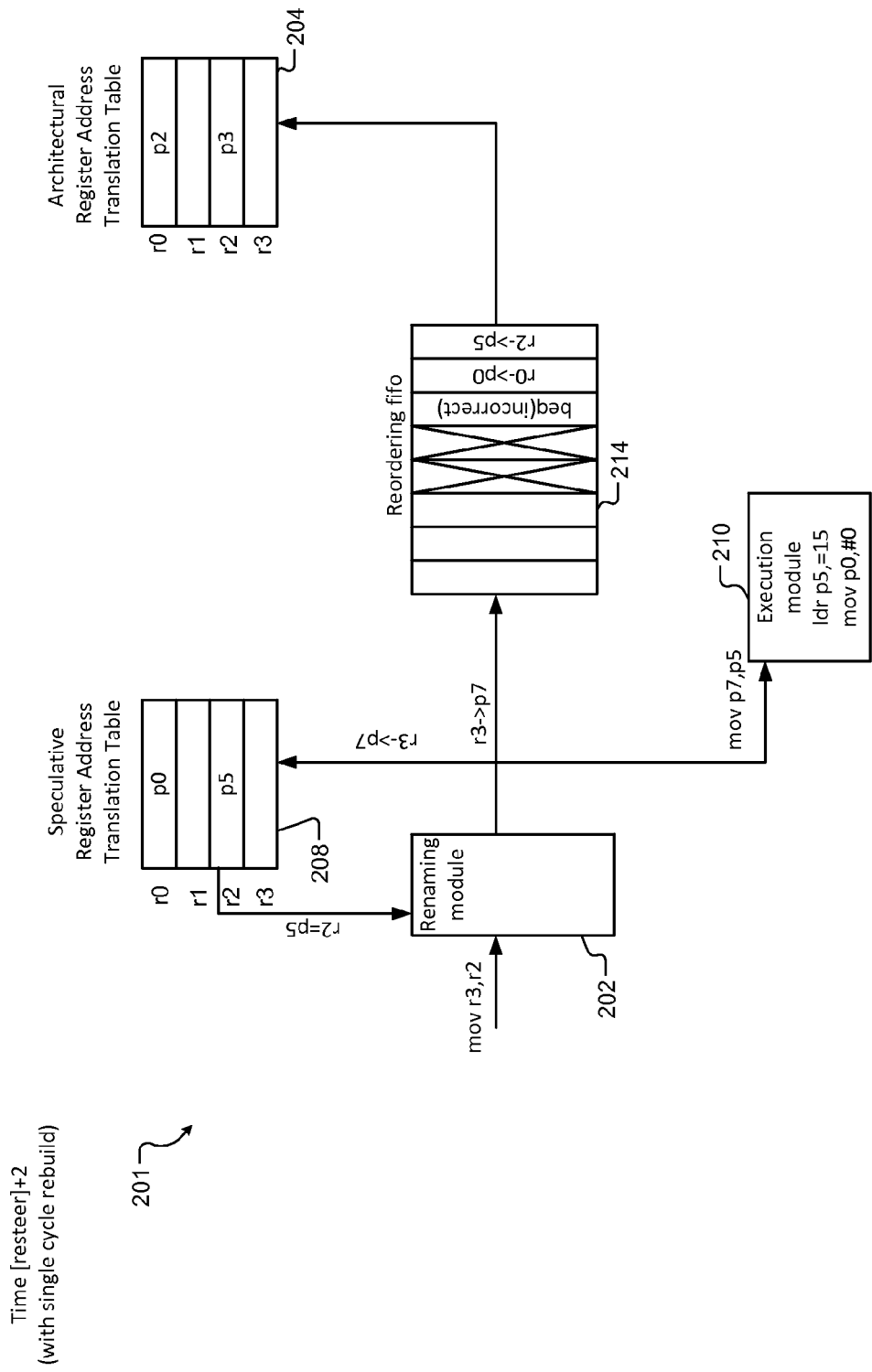

FIGS. 3A and 3B show a method for updating the speculative RAT table 208 in a single instruction cycle of the processor. In FIG. 3A, an updating module 212 updates the data in the speculative RAT table 208 using the data in the architectural RAT table 204 and the instructions pending in the FIFO buffer 214. Specifically, the updating module 212 generates the correct pointers that would have been stored in the speculative RAT table 208 if the instructions pending in the FIFO buffer 214 had retired. FIG. 3B shows the result after updating the speculative RAT table 208 is complete. Accordingly, in FIG. 3B, when a new instruction such as mov r3,r2 is received, the speculative RAT table 208 provides the correct pointer for the architectural register r2 as r2=p5.

Figure 4A:
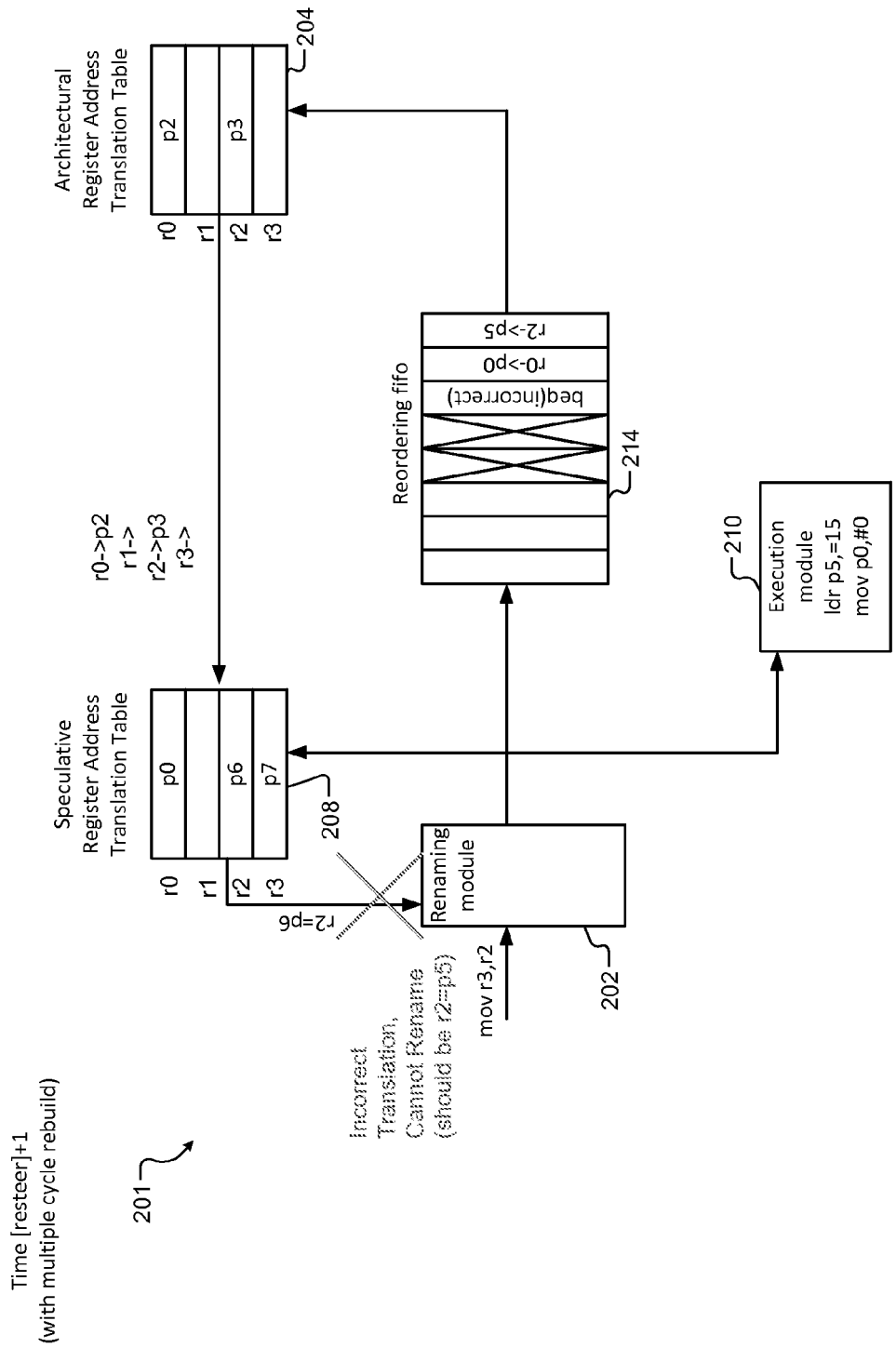
FIGS. 4A-4D show a method for updating the speculative RAT table in multiple instruction cycles of the processor according to the present disclosure.
Figure 4B:
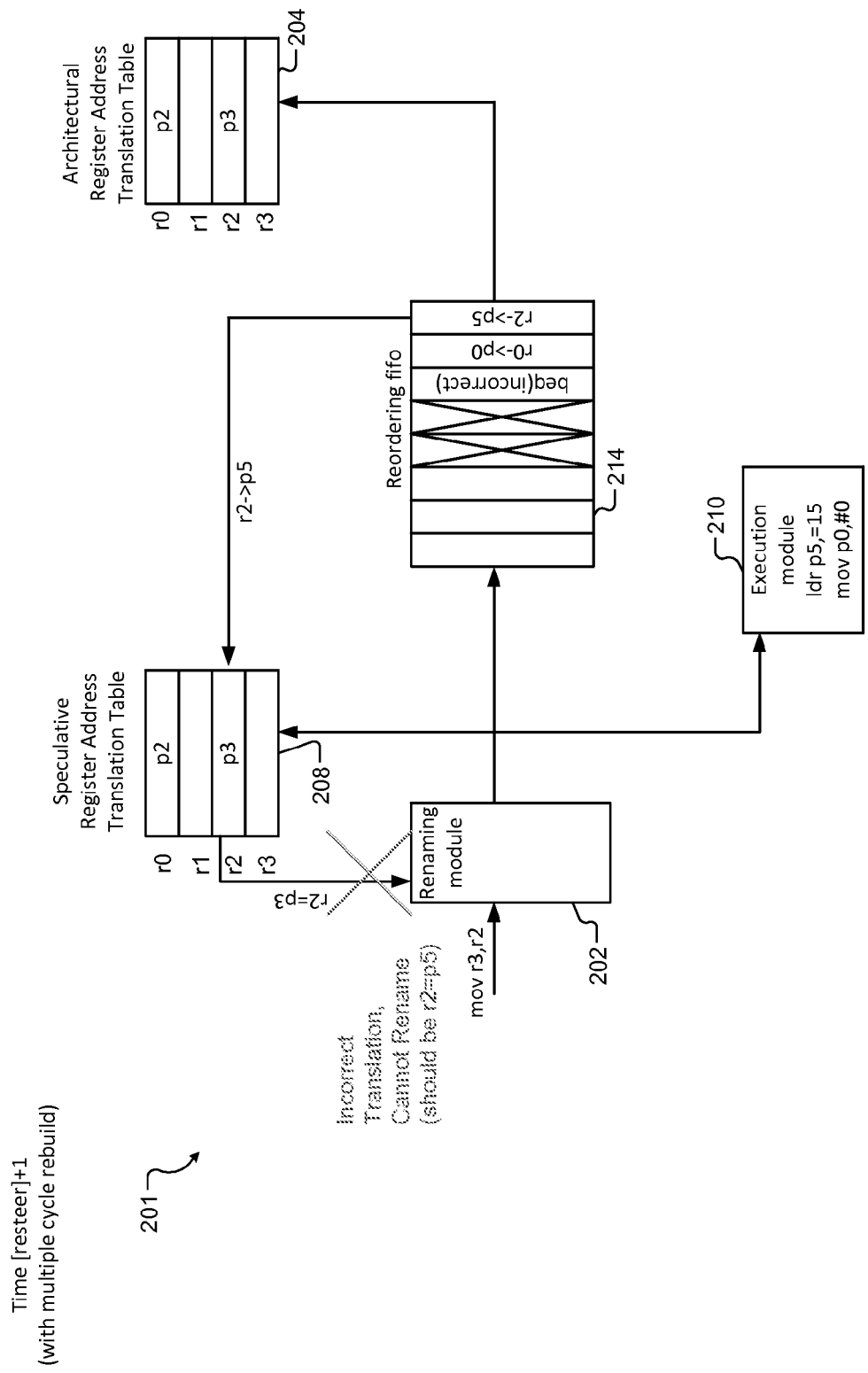
Figure 4C:
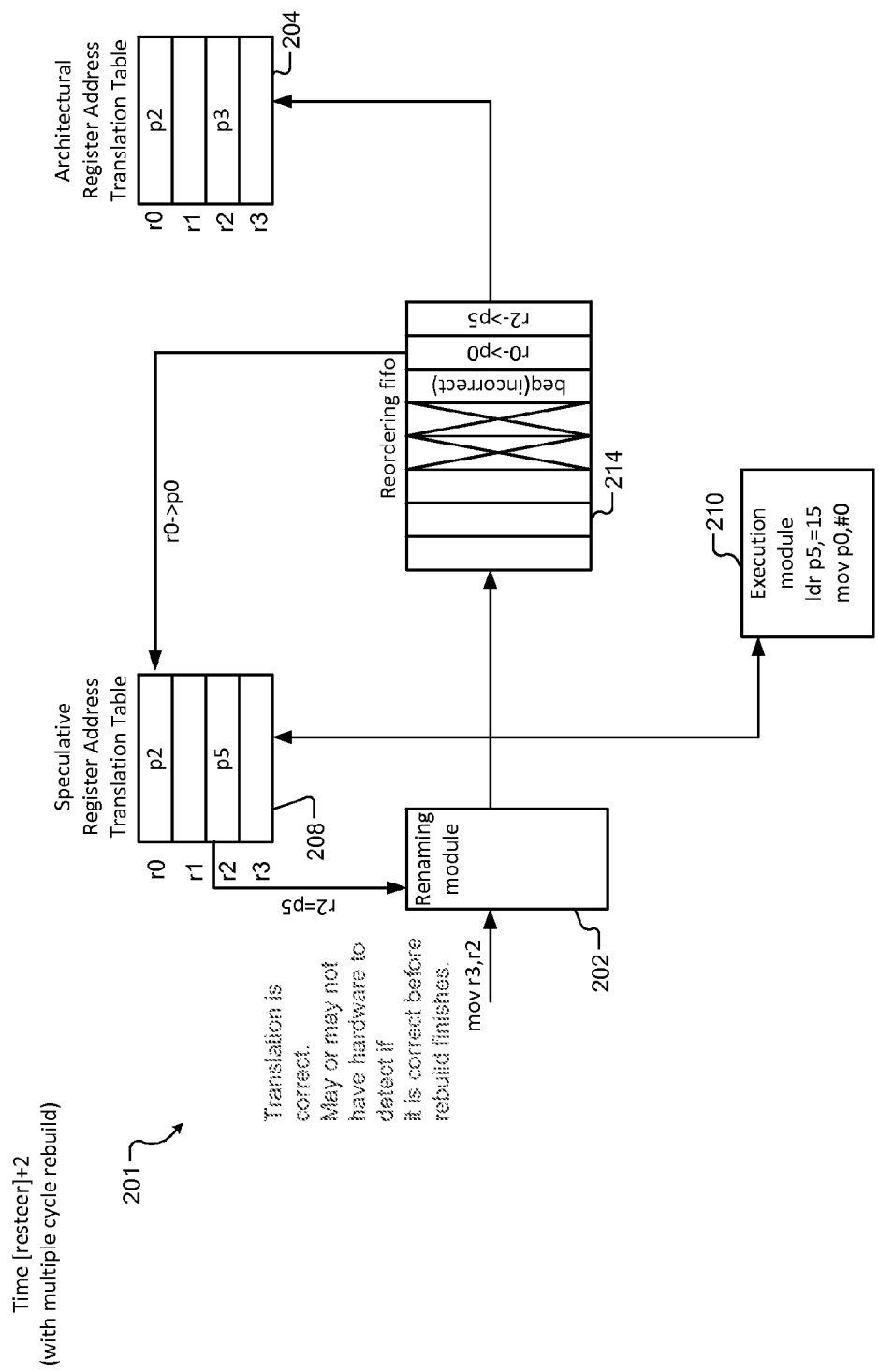

FIGS. 4A-4D show a method for updating the speculative RAT table 208 in multiple instruction cycles of the processor. Specifically, in FIG. 4A, the contents of the architectural RAT table 204 are initially copied into the speculative RAT table 208. Subsequently, as shown in FIGS. 4B and 4C, the contents of the speculative RAT table 208 are updated based on the instructions pending in the FIFO buffer 214.

Specifically, in FIG. 4B, the pointer to the physical register p3 stored in the entry for the architectural register r2 in the speculative RAT table 208 is replaced by a pointer to the physical register p5. In FIG. 4C, the pointer to the physical register p2 stored in the entry for the architectural register r0 in the speculative RAT table 208 is replaced by a pointer to the physical register p0.

Figure 4D:
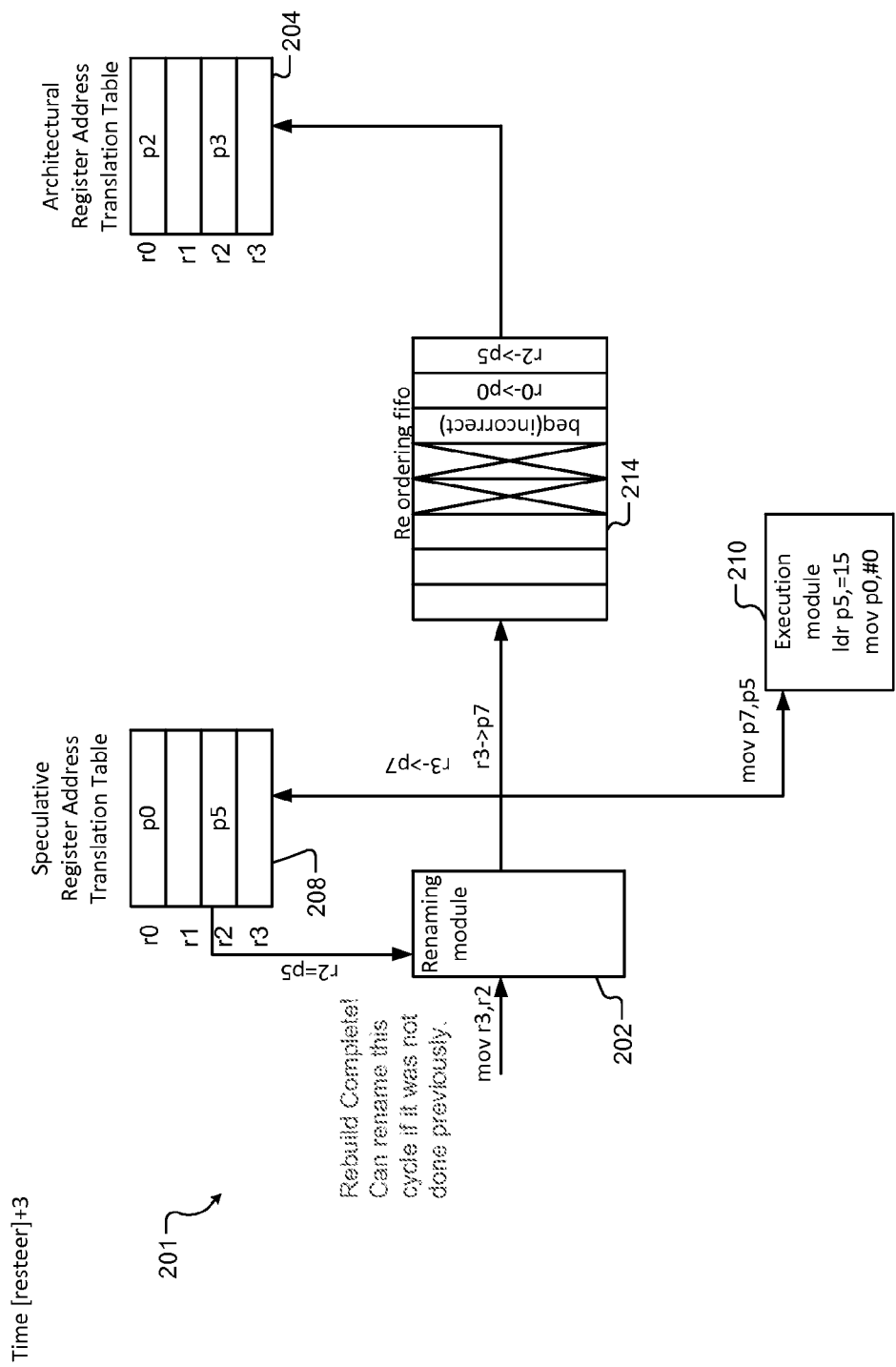

FIG. 4D shows the result after updating the speculative RAT table 208 is complete, which is identical to the result shown in FIG. 3B. Accordingly, in FIG. 4D, when a new instruction such as mov r3,r2 is received, the speculative RAT table 208 provides the correct pointer for the architectural register r2 as r2=p5.

The updates may be performed using a single instruction or a group of instructions at a time. Additionally, the updates may be performed by reading the instructions in the FIFO buffer 214 from right to left (i.e., oldest to newest instructions) or from left to right (i.e., from newest to oldest instructions). For example, if multiple instructions pending in the FIFO buffer 214 use the same architectural register but different physical registers, updating can be performed using instructions from left to right so that the processor 201 can begin executing new instructions using the partially updated speculative RAT table 208 without waiting for the entire speculative RAT table 208 to be updated. In any case, as entries in the speculative RAT table 208 are updated, the entries can be flagged as updated, and the processor 201 can begin executing new instructions using the updated entries.

Figure 5:
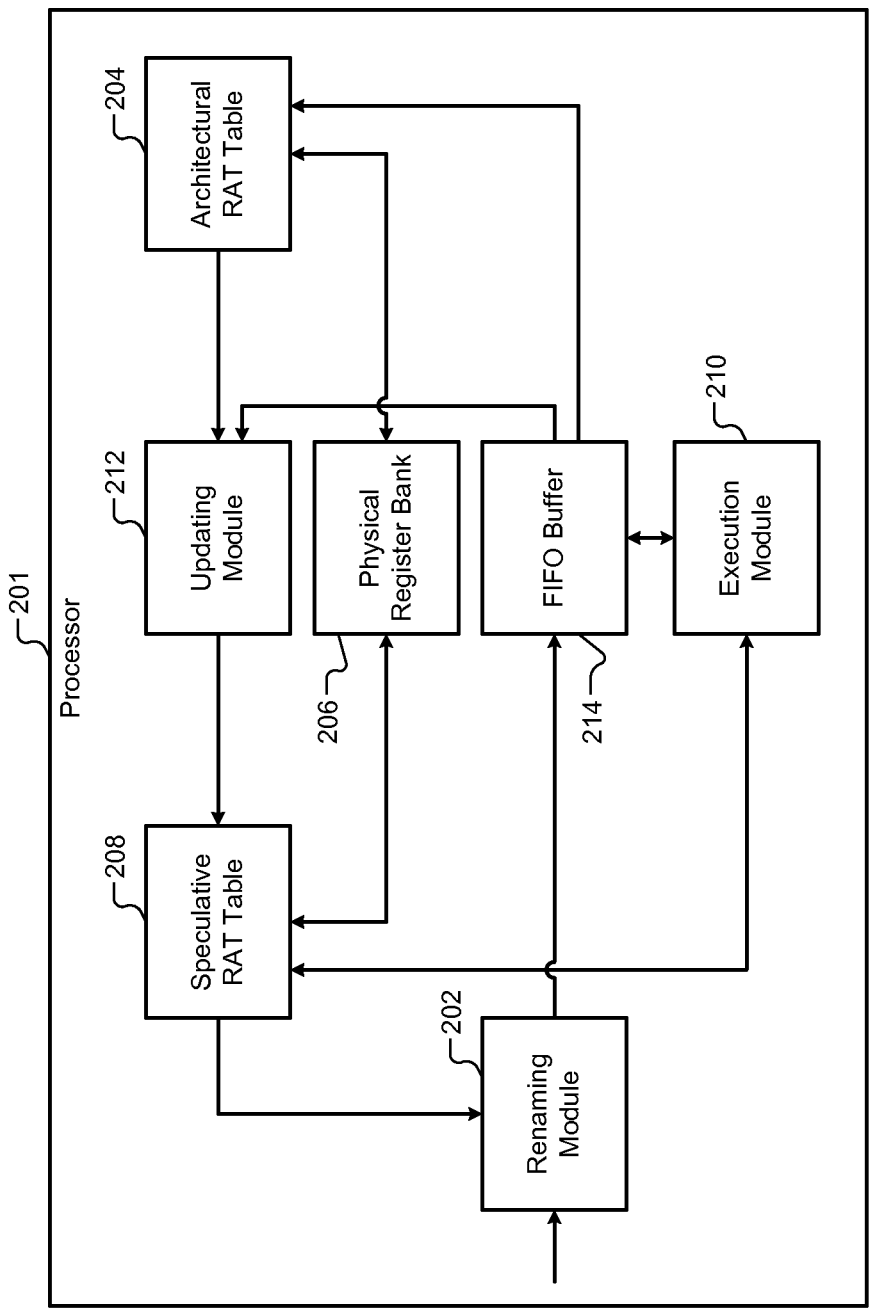
FIG. 5 shows a processor configured to update the speculative RAT table according to the present disclosure.

FIG. 5 shows a processor 201 configured to update the speculative register address translation table according to the present disclosure. The processor 201 includes a renaming module 202, an architectural register address translation (RAT) table 204, a physical register bank 206, a speculative RAT table 208, an execution module 210, an updating module 212, and a FIFO buffer 214.

The processor 201 includes a plurality of architectural registers. The architectural registers are used by the processor 201 to execute one or more instructions. The processor 201 also includes a plurality of physical registers. The physical register bank 206 includes the plurality of physical registers. The processor 201 includes a memory that includes the architectural RAT table 204, the physical register bank 206, the speculative RAT table 208, and the FIFO buffer 214.

The renaming module 202 is configured to rename one or more of the architectural registers to one or more physical registers when the processor 201 receives a plurality of instructions for execution. The architectural RAT table 204 stores pointers to the physical registers that store data generated by retired instructions (i.e., instructions whose execution is completed by the processor 201). The speculative RAT table 208 stores pointers to the physical registers that store data that will be generated by a set of instructions that are received but not yet executed by the processor 201, where the data will be used by new instructions not yet received by the processor 201. The FIFO buffer 214 stores the set of instructions that are received but not yet executed by the processor 201.

The execution module 210 executes instructions. When an event such as a mis-predicted branch or exception occurs, the execution module 210 discards one or more instructions from the set of instructions received but not executed by the processor 201. The updating module 212 updates pointers in the speculative RAT table 208 in response to the event. The updated pointers are generated based on pointers stored in the architectural RAT table 204 at the time of occurrence of the event and based on one or more instructions from the set of instructions not discarded by the execution module 210 (i.e., instructions pending execution in the FIFO buffer 214). Accordingly, the execution module 210 can execute a new instruction subsequent to the event based on the updated pointers in the speculative RAT table 208.

In one implementation, the updating module 212 updates the pointers in the speculative RAT table 208 in a time period equivalent to one instruction cycle of the processor 201. The updating module 212 updates the pointers in the speculative RAT table 208 by copying the pointers from the architectural RAT table 204 to the speculative RAT table 208, and by updating the pointers copied into the speculative RAT table 208 based on one or more instructions from the set of instructions not discarded by the execution module 210 (i.e., instructions pending execution in the FIFO buffer 214).

The FIFO buffer 214 stores instructions, that are received and renamed but not yet executed by the processor 201, in an order in which the instructions are received by the renaming module 202. The updating module 212 may update the pointers in the speculative RAT table 208 in one of two ways. The updating module 212 may update the pointers in the speculative RAT table 208 using one or more instructions from the set of instructions not discarded by the execution module 210 in the order in which the instructions are stored in the FIFO buffer 214. Alternatively, the updating module 212 may update the pointers in the speculative RAT table 208 using one or more instructions from the set of instructions not discarded by the execution module 210 in an opposite or reverse order than the order in which the instructions are stored in the FIFO buffer 214.

Figure 6:
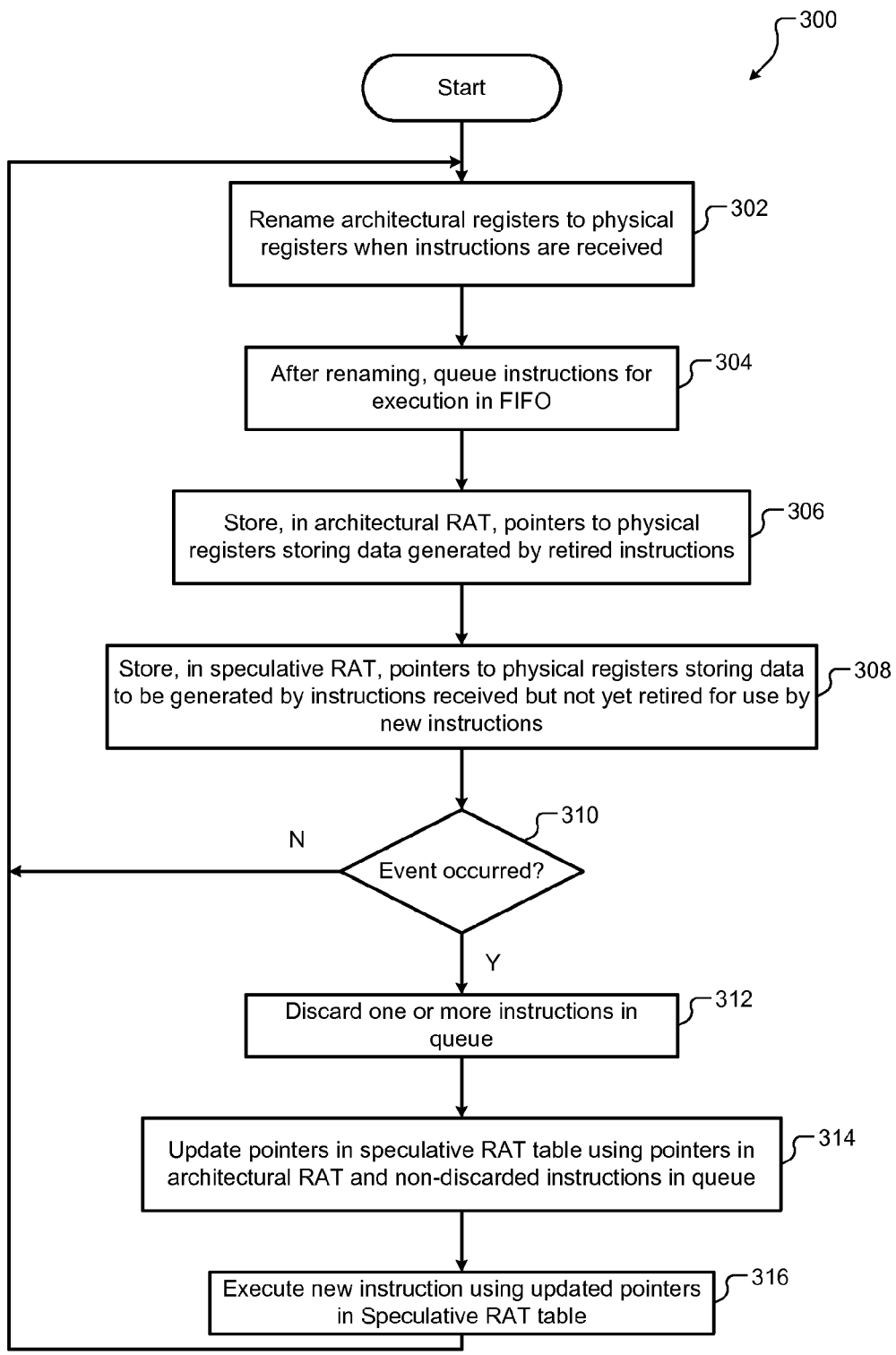
FIG. 6 shows a method for updating the speculative RAT table according to the present disclosure.

FIG. 6 shows a method 300 for updating the speculative register address translation table according to the present disclosure. At 302, control renames architectural registers to physical registers when instructions are received. At 304, after renaming, control queues instructions for execution (e.g., in FIFO). At 306, control stores, in the architectural RAT table, pointers to physical registers storing data generated by retired instructions. At 308, control stores, in the speculative RAT table, pointers to physical registers storing data to be generated by instructions received but not yet retired, for use by new instructions. At 310, control determines whether an event, such as a mis-predicted branch or exception, occurred. If an event did not occur, control returns to 302. At 312, if an event occurred, control discards one or more instructions pending execution in the FIFO. At 314, control updates pointers in the speculative RAT table as described above using pointers in the architectural RAT table and non-discarded instructions pending execution in the FIFO. At 316, control executes new instructions using updated pointers in speculative RAT table. Control returns to 302.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A processor comprising:
   a plurality of architectural registers of the processor, wherein the architectural registers are used by the processor to execute one or more instructions;
   a renaming module configured to rename one or more of the architectural registers to one or more physical registers in the processor in response to the processor receiving a plurality of instructions for execution;
   a memory comprising
      a first table configured to store pointers to the physical registers storing data generated in response to the processor completing execution of one or more instructions, and
      a second table configured to store pointers to the physical registers storing data to be (i) generated by a set of instructions received but not executed by the processor and (ii) used by instructions to be received by the processor;
   an execution module configured to
      execute the plurality of instructions, and
      discard one or more instructions from the set of instructions received but not executed by the processor in response to an event; and
   an updating module configured to update pointers in the second table in response to the event, wherein the updated pointers are generated based on (i) pointers stored in the first table at a time of occurrence of the event, and (ii) one or more instructions from the set of instructions not discarded by the execution module.

2. The processor of claim 1, wherein the execution module is configured to execute an instruction subsequent to the event based on the updated pointers.

3. The processor of claim 1, wherein the updating module is configured to update the pointers in the second table in a time period equivalent to one instruction cycle of the processor.

4. The processor of claim 1, wherein the updating module is configured to update the pointers in the second table by (i) copying the pointers from the first table to the second table, and (ii) updating the pointers copied into the second table based on the one or more instructions from the set of instructions not discarded by the execution module.

5. The processor of claim 1, further comprising a first-in first-out memory configured to store instructions received but not executed by the processor in an order in which the instructions are received by the renaming module.

6. The processor of claim 5, wherein the updating module is configured to update the pointers in the second table using the one or more instructions from the set of instructions not discarded by the execution module in the order in which the instructions are stored in the first-in first-out memory.

7. The processor of claim 5, wherein the updating module is configured to update the pointers in the second table using the one or more instructions from the set of instructions not discarded by the execution module in an opposite order in which the instructions are stored in the first-in first-out memory.

8. A method comprising:
   renaming one or more of architectural registers of a processor to one or more physical registers in the processor in response to the processor receiving a plurality of instructions for execution, wherein the architectural registers are used by the processor to execute one or more of the plurality of instructions;
   storing, in a first table, pointers to the physical registers storing data generated in response to the processor completing execution of one or more instructions;
   storing, in a second table, pointers to the physical registers storing data to be (i) generated by a set of instructions received but not executed by the processor and (ii) used by instructions to be received by the processor;
   executing the plurality of instructions;
   discarding one or more instructions from the set of instructions received but not executed by the processor in response to an event; and
   updating pointers in the second table in response to the event, wherein the updated pointers are generated based on (i) pointers stored in the first table at a time of occurrence of the event, and (ii) one or more instructions from the set of instructions not discarded.

9. The method of claim 8, further comprising executing an instruction subsequent to the event based on the updated pointers.

10. The method of claim 8, further comprising updating the pointers in the second table in a time period equivalent to one instruction cycle of the processor.

11. The method of claim 8, further comprising updating the pointers in the second table by (i) copying the pointers from the first table to the second table, and (ii) updating the pointers copied into the second table based on the one or more instructions from the set of instructions not discarded.

12. The method of claim 8, further comprising storing, in a first-in first-out memory, instructions received but not executed by the processor in an order in which the instructions are received.

13. The method of claim 12, further comprising updating the pointers in the second table, using the one or more instructions from the set of instructions not discarded, in the order in which the instructions are stored in the first-in first-out memory.

14. The method of claim 12, further comprising updating the pointers in the second table, using the one or more instructions from the set of instructions not discarded, in an opposite order in which the instructions are stored in the first-in first-out memory.

* * * * *